United States Patent
Zimmermann et al.

(10) Patent No.: US 6,794,037 B2
(45) Date of Patent: Sep. 21, 2004

(54) HIGH CHROMA EFFECT MATERIALS

(75) Inventors: Curtis J. Zimmermann, Cold Spring, NY (US); Steven A. Jones, Budd Lake, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/318,110

(22) Filed: Dec. 13, 2002

(65) Prior Publication Data

US 2004/0115432 A1 Jun. 17, 2004

(51) Int. Cl.[7] .................................................. B32B 5/16
(52) U.S. Cl. ..................... 428/403; 428/404; 428/406; 428/407; 106/415; 106/417; 106/418; 106/419; 106/425; 106/436
(58) Field of Search ................................. 428/403, 404, 428/406, 407; 106/415, 417, 418, 419, 425, 436

(56) References Cited

U.S. PATENT DOCUMENTS

| | | | |
|---|---|---|---|
| 4,328,042 A | | 5/1982 | Ostertag et al. |
| 4,954,175 A | * | 9/1990 | Ito et al. ..................... 106/417 |
| 6,325,847 B1 | * | 12/2001 | Christie et al. ............. 106/417 |
| 6,440,208 B1 | * | 8/2002 | Christie et al. ............. 106/415 |
| 6,582,764 B2 | * | 6/2003 | Fuller et al. ................. 427/217 |

\* cited by examiner

Primary Examiner—Leszek Kiliman
(74) Attorney, Agent, or Firm—Melanie L. Brown

(57) ABSTRACT

A color effect material is described as composed of a plurality of encapsulated substrate platelets in which each platelet is encapsulated with a highly reflective silver layer which acts as a reflector to light directed thereon, a spacer layer which is selectively transparent to light directed thereon, and an iron oxide layer on the spacer layer.

18 Claims, No Drawings

HIGH CHROMA EFFECT MATERIALS

BACKGROUND OF THE INVENTION

The provision of metallic effects in surface coatings, plastics coloration, cosmetic preparations and the like is well known. To achieve this effect, one approach has been to disperse both a metallic pigment and a transparent colored pigment in the composition. The metallic pigment is usually aluminum flake and the colored pigment can be, for instance, iron oxide. The art has also combined the two pigments into a single entity by precipitating the colored material on the aluminum flake.

The precipitation of, for instance, iron oxide on the aluminum flake was often carried out from an aqueous solution but that gave rise to various difficulties. Aluminum readily reacts in aqueous media, very dilute solutions of the iron oxide were required, complexing additives were necessary and the procedure had to be carried out in a limited pH range.

An alternate, non-aqueous procedure is described in U.S. Pat. No. 4,328,042. Here, iron pentacarbonyl is oxidized to iron oxide and carbon dioxide in a fluidized bed of the aluminum flake with oxygen at elevated temperature. To obtain reproducible results, the carbonyl cannot exceed 5 volume percent of the fluidizing gas. The use of the low concentration carbonyl and fluidized bed operation are obvious drawbacks of this approach.

It is desirable to provide a color effect material (CEM) which has the same or better pigment properties as the products just mentioned, particularly a high chroma, but without encountering the production and materials limitations of that prior art. The present invention is directed to satisfying that desire.

SUMMARY OF THE INVENTION

The present invention provides a high chroma effect material comprising a platelet-shaped substrate encapsulated with: (a) a highly light reflective first layer of silver, (b) a spacer layer of metal oxide, nitride, fluoride or carbide or polymer; whose refractive index is sufficiently high to minimize the incident angle dependent variable pathlength difference, in accordance with Snell's Law, or thin enough to not be optically active; (c) an iron oxide layer, and optionally, (d) a light transparent layer which is either the same or a different metal as in the first layer or a spacer layer material different from that in the spacer layer and whose refractive index is higher than that of the spacer layer material. The effect material, where necessary, can be given a post-treatment for specific attributes such as weather stability, polymeric dispersability and cosmetic compatibility. The method of producing the effect material pigment is also a part of this invention.

DESCRIPTION OF THE INVENTION

It is an object of the present invention to provide novel metal effect materials which can also be prepared in a reliable, reproducible and technically efficient manner. This object is achieved by an effect material comprising a platelet-shaped substrate coated with: (a) a highly light reflective silver first layer; (b) a spacer layer; (c) an iron oxide layer, and optionally, (d) a light transparent overlayer.

Any encapsulatable smooth platelet can be used as the substrate in this invention. Examples of usable platelets include mica, aluminum oxide, bismuth oxychloride, boron nitride, glass flake, iron oxide-coated mica or glass, silicon dioxide and titanium dioxide-coated mica or glass. The size of the platelet-shaped substrate is not critical per se and can be adapted to the particular use. In general, the particles have average largest major dimensions of about 5–250 microns, in particular 5–100 microns. Their specific free surface area (BET) is in general from 0.2 to 25 $m^2/g$.

The degree of reflectivity for the first silver encapsulating layer, the highly reflective layer, should be at least about 75% and is preferably at least about 90% reflectivity.

The thickness of the first layer is not critical so long as it is sufficient to make the layer highly reflective. If desirable, the thickness of the first layer can be varied to allow for some selective transmission of light. The thickness is usually about 2 to 100 nm and preferably about 10 nm to 75 nm. The mass percent of this coating can vary considerably because it is directly related to the surface area of the particular substrate being utilized and the thickness necessary to achieve the desired reflectivity. In general, the silver thickness should be at least about 5 nm, preferably from about 10 to 75 nm. A thickness of outside of the above-mentioned ranges will typically be either completely opaque or allow for substantial transmission of light.

As a result of the high reflectivity, the silver encapsulated substrate is substantially opaque and much more light is reflected than with conventional effect pigments. The amount of light reflected in the case of, for instance, iron oxide-coated mica is on the order of about 18% whereas the amount of light in the effect pigment of the instant invention is on the order of 35%.

The high chroma effect material of the present invention contains a spacer layer encapsulation of the first encapsulating layer of silver. The spacer layer is usually composed of metal, metal oxide or hydroxide (other than iron), nitride, fluoride, or carbide or polymer. One can utilize any material for the spacer layer as long as it does not result in more than 100 degrees of hue angle color travel in accordance with Snell's Law. Examples of suitable materials include chromium oxide, silicon dioxide, magnesium fluoride, magnesium oxide, magnesium hydroxide, aluminum oxide, aluminum hydroxide, zinc oxide, zinc hydroxide, zirconium oxide, zirconium hydroxide, titanium oxide, titanium hydroxide, titanium nitride, and polymers such as polymethyl methacrylate, polyethylene terephthalate and high density polyethylene. Preferably, the material is silicon dioxide ($SiO_2$), a suboxide of silicon dioxide ($SiO_{0.25}$ to $SiO_{1.95}$) or magnesium fluoride.

The spacer layer material and the thickness of the layer are selected such that the layer does not provide a significant incident angle dependent variable pathlength difference in accordance with Snell's Law, i.e., does not result in more than 100 degrees of hue angle color travel. Therefore, the particular thickness of the layer is not important so long this criteria is met. One convenient way to meet this requirement is to make the layer suitably thin. For example, materials having a refractive index around 1.5 should have a film thickness of no more than 100 nanometers so as to not generate hue angle color travel of more than 100 degrees. When the layer is of silicon dioxide or magnesium fluoride, it preferably has a thickness of about 25 to 75 nm. For a layer material having a high refractive index, such as for iron oxide or titanium dioxide, the layer can be any thickness sufficient to produce the desired result.

Incident angle dependent variable pathlength difference is related to the degrees of hue angle change when changing the view from normal incidence to a high specular angle.

The thickness of the layer, its refractive index, and Snell's law all contribute to the incident angle dependent variable pathlength difference. The pathlength, which determines the color, is calculated by the equation $2(n)(d) \cos \theta_2$, where n is the refractive index, d is the thickness in nm and $\theta_2$ is the refraction angle. The refraction angle $\theta_2$ is determined by Snell's law $n_1 \sin \theta_1 = n_2 \sin \theta_2$, where $n_1$ is the refractive index of the incident medium (here the reflecting layer), $n_2$ is the refractive index of the (spacer) layer, and $\theta_1$ is the incident angle. A spacer layer with high refractive index would therefore not produce large differences in $\theta_2$ with increasing $\theta_1$ and would not produce significant pathlength differences. A layer with a low refractive index on the other hand, would produce large differences in $\theta_2$ with increasing $\theta_1$ and would produce significant pathlength differences unless the layer thickness is too thin to produce thin film interference. Thus, the spacer layer will not produce a significant incident angle dependent variable pathlength difference when it has a high refractive index and/or it is too thin to produce thin film interference. The purpose of the spacer layer is to provide non-limiting decorative and/or functional attributes such as color, adhesion promotion, and film stress relief.

The effect material of the present invention contains an iron oxide layer directly encapsulated on the spacer layer. The thickness of this layer can vary considerably. As the thickness increases, interference colors are realized. In general, the layer thickness is about 40 to 200 nm, and preferably about 60 to 180 nm.

The optional, outer encapsulating layer, when present, is a material providing a transparency of about 25–75% transmission. More preferably, one would prefer to have about 40–60% transparency for the outer encapsulating layer. The degree of reflectivity and transparency for the different layers can be determined using a variety of methods such as ASTM method E1347-97, E1348-90 (1996) or F1252-89 (1996), all of which are substantially equivalent for the purposes of this invention.

The material employed as the outer layer can be selected from the same group as the materials of the reflecting layer. Alternatively, the outer layer may also be a metal oxide (other than iron oxide), nitride or carbide provided that it is different than that of the spacer layer and also has a higher refractive index.

The materials of the invention are notable for multiple encapsulation of the platelet-shaped substrate. In one embodiment, the silver layer, spacer layer and iron oxide layer are encapsulated by a selectively-transparent outer layer that allows for partial reflection of light directed thereon. Preferably, the outer encapsulating layer is selected from the group consisting of silicon, chromium oxide, a mixed metal oxide, titanium dioxide, titanium nitride and aluminum, so as the refracive index is higher than the spacer layer. More preferably, the outer layer is one or more precious metal or alloys thereof.

The optional outer layer is, of course, a part of the optical package. Its thickness can vary but must always allow for partial transparency. For instance, the layer has a preferable thickness of about 5 to 20 nm for silicon; about 2 to 15 nm for aluminum; about 1–15 nm for titanium nitride; about 10 to 100 nm for chromium oxide; about 10–200 nm for titanium dioxide; about 5 to 60 nm for a mixed metal oxide, about 5 to 20 nm for silver; about 3 to 20 nm for gold; about 3–20 nm for platinum; and about 5 to 20 nm for palladium. The metal alloys generally have a similar film thickness compared to the pure metal. It is recognized that a film thickness out of the above range may be applicable depending on the desired effect.

All the encapsulating layers of the effect material of the invention are altogether notable for a uniform, homogeneous, film-like structure that results from the manner of preparation according to the invention.

One advantage of the present invention is that one does not have to start with a traditional metal flake which may have structural integrity problems, hydrogen outgassing problems and a host of other perceived issues (pyrophoric and environmental concerns) typically associated with metal flakes. The silver used in this invention is much more chemically stable than aluminum and generally prefer to be in its non-oxidized metallic ground state. Furthermore, silver can maximize the chromaticity of the reflected color(s) of the iron oxide. In addition, when silver is used as the final (outer) layer of the particle, it may impart electrical conductivity to the effect material which may be desirable in some applications such as powder coatings.

While the metal layers can be deposited by any known means, they are preferably deposited by electroless deposition and the non-metal layers preferably by aqueous or non-aqueous sol-gel deposition. An advantage of electroless deposition (Egypt. J. Anal. Chem., Vol. 3, 118–123 (1994)) is that it is a worldwide established chemical technique, not requiring cumbersome and expensive infrastructure compared to other techniques. The electroless deposition technique also allows one to control the degree of reflectivity of light quite accurately and easily by varying the metal film thickness. Additionally, the known procedures are generalized procedures capable of being utilized for coating a variety of surfaces. Furthermore, a layer of a metal or metal oxide can also be deposited onto any of the substrates by chemical vapor deposition from an appropriate precursor (The Chemistry of Metal CVD, edited by Toivo T. Kodas and Mark J. Hampden-Smith; VCH Verlagsgesellschaft mbH, D-69451 Weinheim, 1994, ISBN 3-527-29071-0).

The products of the present invention are useful in automotive, cosmetic, industrial or any other application where metal flake, pearlescent pigments or absorption pigments are traditionally used.

In the novel process for preparing the coated platelet-like substrates, the individual coating steps are each effected by known procedures such as by electroless deposition or hydrolysis/condensation of suitable starting compounds in the presence of the substrate particles to be coated. For instance, the silver can be deposited from reduction of its aqueous salts, such as $AgNO_3$ Silicon dioxide can be deposited from silicon tetraalkoxides such as tetraethoxysilane, bases such as sodium silicate and halide silanes such as silicon tetrachloride; titanium dioxide from tetraalkoxides such as titanium isopropoxide and titanium tetraethoxide, halide compounds such as titanium tetrachloride and sulfate compounds such as titanium sulfate, titanium nitride from titanium tetrachloride, tetrakis(diethylamido)titanium (TDEAT) and tetrakis(dimethylamido)-titanium (TDMAT); iron oxide from iron carbonyl, iron sulfate, iron nitrate and iron chloride; and chromium oxide from chromium carbonyl and chromium chloride.

In general, the synthesis of the color effect material can be as follows: a platelet material such as mica or glass flake is suspended while stirring in an aqueous medium. The platelet substrate acts as a carrier substrate. It may, but usually does not, have a contribution or effect on the final optical properties of the particulate. To the suspension is added a metal precursor capable of depositing the desired silver metal on the substrate by electroless deposition, along with a suitable reducing agent. The resulting highly reflective silver metal coated substrate is filtered, washed and re-suspended in an alcoholic medium such as butanol. A Stöber process can be employed for the deposition of a silicon dioxide spacer layer on the silver coated mica or other substrate (C. Jeffrey Brinker and George W. Scherer, Sol-Gel Science, The Physics and Chemistry of Sol-Gel Processing, Academic Press, Inc. (1990)). An alcoholic azeotropic mixture, such as ethanol and water, may be used in place of pure alcohol for the Stöber process. The silica encapsulated silver coated platelet is filtered, washed and re-suspended in a stirred aqueous medium. An aqueous solution of an iron salt is added and the pH is changed to deposit the iron on the spacer layer. Then to the aqueous medium, a metal solution for electroless deposition is added as described above allowing for the deposition of a selectively transparent metal coating. The final particulate product is washed and dried.

The color effect materials of the invention are advantageous for many purposes, such as the coloring of paints, printing inks, plastics, glasses, ceramic products and decorative cosmetic and personal care preparations. Their special functional properties make them suitable for many other purposes. The effect materials with a conductive outerlayer, for example, could be used in electrically conductive or electromagnetically screening plastics, paints or coatings or in conductive polymers. The conductive functionality of these effect materials make them have great utility for powder coating applications.

Products of this invention have an unlimited use in all types of automotive and industrial paint applications, especially in the organic color coating and inks field where deep color intensity is required. For example, these effect materials can be used in mass tone or as styling agents to spray paint all types of automotive and non-automotive vehicles. Similarly, they can be used on all clay/formica/wood/glass/metal/enamel/ceramic and non-porous or porous surfaces. The effect materials can be used in powder coating compositions. They can be incorporated into plastic articles geared for the toy industry or the home. These effect materials can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288. The foregoing references are hereby incorporated by reference herein for their teachings of ink, paint and plastic compositions, formulations and vehicles in which the compositions of this invention may be used including amounts of colorants. For example, the effect material may be used at a level of 10 to 15% in an offset lithographic ink, with the remainder being a vehicle containing gelled and ungelled hydrocarbon resins, alkyd resins, wax compounds and aliphatic solvent. The effect material may also be used, for example, at a level of 1 to 10% in an automotive paint formulation along with other pigments which may include titanium dioxide, acrylic lattices, coalescing agents, water or solvents. The effect material may also be used, for example, at a level of 20 to 30% in a plastic color concentrate in polyethylene.

In the cosmetic field, the effect materials can be used in all cosmetic and personal care applications subject, of course, to all regulatory requirements. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

For a review of cosmetic applications, see Cosmetics: Science and Technology, 2nd Ed., Eds: M. S. Balsam and Edward Sagarin, Wiley-Interscience (1972) and deNavarre, The Chemistry and Science of Cosmetics, 2nd Ed., Vols 1 and 2 (1962), Van Nostrand Co. Inc., Vols 3 and 4 (1975), Continental Press, both of which are hereby incorporated by reference.

Some illustrative examples of the invention will now be set forth. In these, as well as throughout this specification and claims, all parts and percentages are by weight and all temperatures are in degrees Centigrade, unless otherwise indicated.

EXAMPLE 1

One hundred grams of 100 micron glass flakes (100 micron average major dimension) is placed in a 1 liter beaker equipped with a magnetic stir bar and containing 393 grams of a 2% dextrose solution. The slurry is stirred at room temperature.

To the slurry is rapidly added a solution which is prepared as follows: 7.87 grams of silver nitrate crystals are dissolved into 375 ml distilled water using a magnetic stirrer. A 29% solution of ammonium hydroxide is added dropwise to the beaker resulting in a brown precipitate which redissolves at a higher concentration of the ammonium hydroxide solution. At the point where the solution becomes clear again, 5 extra drops of the ammonium hydroxide solution is added to ensure excess.

Several changes in the shade of the slurry occur as the reaction proceeds. After 15 minutes of stirring, the supernatant liquid is tested for silver ion by the addition of a few drops of concentrated hydrochloric acid. The test is a visual assessment of any precipitate and/or turbidity of which none is found. The slurry is filtered and rinsed several times with distilled water and the presscake is dried at 100° C. to a constant mass. The dried sample is a lustrous, opaque and silver colored material.

A thin silica spacer layer is applied to the reflective metal coated substrate as follows. In a 3 l flask, 600 g of the silver coated borosilicate flake is slurried in 1028 ml of 2-propanol. To the slurry is added 8 ml of 29% ammonium hydroxide and 64 ml of distilled water. The mechanically stirred slurry is heated to 60° C., at which time 33.2 g of tetraethoxysilane is added. After about 20 hours, the slurry is cooled, filtered, and washed with a few 100 ml aliquots of 2-propanol. The coated product is dried for 24 hours at 120° C.

The resulting silica-coated silver-coated borosilicate flakes (0.9 kg; average particle size 100 microns) are loaded into a horizontal cylindrical mechanical mixer equipped with mixing blades on a cantilever shaft. A sparger is introduced through the side of the reactor for introduction of reactants. The reactor is heated to 200° C. and nitrogen is added at 168 standard cubic feet per hour (SCFH) through the door end of the reactor. Nitrogen is bubbled through a sealed reservoir of iron pentacarbonyl (IPC) at 5 SCFH resulting in an addition rate of 0.32 g/min of IPC. This reagent flow is combined with an additional 238 SCFH of nitrogen as it enters the sparger which gives a total sparger gas flow of 243 SCFH. The run is continued for 5 hours to allow color progression advancements with the iron oxide layer thickness. A sample is periodically removed from the reactor to assess the color progression as a function of time.

EXAMPLE 2

125 grams of silica-coated silver-coated glass flake (produced as set forth in Example 1) is slurried in 300 ml distilled water in a 1 L round-bottom flask at 300 rpm and heated to 50° C. Then 300 ml of 0.19 M $Fe(NO_3)_3 \cdot 9H_2O$ is added at 0.3 ml/min. while maintaining a pH of 4.0 with 5% $NH_4OH$. At the end of the addition (approx. 16 hours), the sample is heated to 90° C. for 4 hours. The sample is then filtered hot, washed and dried at room temperature. The sample exhibits a unique golden bronze color.

EXAMPLE 3

In a 3 l flask, 200 g of the silica-coated silver-coated glass flake (produced as set forth in Example 1) is slurried in 500 ml of distilled water and heated to 75° C. The pH is lowered to 5 using 15% acetic acid. A solution of 22.5% $Fe(NO_3)_3 \cdot 9H_2O$ is added at 0.25 ml/min. Once the pH reached 3.5, 10% NaOH is used to hold the pH constant. Approximately 400 ml of the iron(III) nitrate solution is added. The resulting sample is filtered, washed, and dried at 200° C. yielding a highly reflective gold colored effect material.

EXAMPLE 4

Example 3 is repeated except that approximately 600 ml of the iron(III) nitrate solution is added. The resulting sample is filtered, washed, and dried at 200° C. yielding a highly reflective golden orange colored effect material.

EXAMPLE 5

Example 3 is repeated except approximately 800 ml of the iron(III) nitrate solution is added. The resulting sample is filtered, washed, and dried at 200° C. yielding a highly reflective golden orange colored effect material.

EXAMPLE 6

A thin titania spacer layer is applied to a reflective metal coated substrate as follows. In a 3 l flask, 100 g of silver coated borosilicate flake prepared in Example 1 is slurried in 1200 ml of ethanol. To the slurry is added 1.14 g of 39% hydrochloric acid and 70 ml of distilled water. Then 69 g of titanium tetraisopropoxide is added to the mechanically stirred slurry. After about 24 hours, the slurry is filtered, and washed with a few 100 ml aliquots of ethanol. The coated product is dried for 24 hours at 200° C.

EXAMPLE 7

A thin titania spacer layer is applied to a reflective metal coated substrate as follows. In a 5 l flask, 100 g of silver coated borosilicate flake prepared in Example 1 is slurried in 3600 ml of ethanol. To the slurry is added 3.42 g of 39% hydrochloric acid and 210 ml of distilled water. Then 207 g of titanium tetraisopropoxide is added to the mechanically stirred slurry. After about 24 hours, the slurry is filtered, and washed with a few 100 ml aliquots of ethanol. The coated product is dried for 24 hours at 200° C.

EXAMPLE 8

The electroless silver method of Example 1 is used to produce a 5 nm thick silver third layer on 100 g of the product of Example 7.

EXAMPLE 9

Fifty grams of silver coated borosilicate flake prepared in Example 1 is placed in a 1 liter oven dried Morton flask containing 650 ml of mineral spirits (boiling point 179–210° C.) previously dried over anhydrous magnesium sulfate. A condenser containing drierite desiccant is fitted to one neck of the 3-neck Morton flask with a stirring shaft and temperature probe fitted to the other two necks. The suspension is stirred at 250 rpm and heated to 100° C. To the heated suspension is added 0.82 gram of benzoyl peroxide crystals followed by 7.4 grams of divinylbenzene (mixture of isomers). The reaction is allowed to stir at 100° C. for 18 hours and then cooled to 45° C. The entire suspension is then filtered on a Buchner funnel using #2 Whatman filter paper, rinsed with ethanol and the product dried at 120° C. The resulting divinylbenzene coating is visibly transparent and does not decrease the high reflectivity of the silver coated borosilicate flake.

Fifty grams of the polymer coated, silver coated borosilicate flake is slurried in 500 ml of ethanol. To the slurry is added 1.14 g of 39% hydrochloric acid and 70 ml of distilled water. 69 g of titanium tetraisopropoxide is added to the mechanically stirred slurry. After 20 hours, the slurry is filtered, and washed with a 100 ml aliquot of ethanol. The coated product is dried for 24 hours at 95° C.

EXAMPLE 10

Ten grams of the product produced in Example 9 is dispersed in 100 ml of distilled water in a 250 ml 3-neck flask. A stirring shaft, pH meter and temperature probe are fitted to the 3-neck flask. The suspension is stirred at 250 rpm. To the suspension is added a colloidal solution of 0.10 grams of tin chloride in 100 ml of distilled water. After 10 minutes of stirring, the suspension is filtered on a Buchner funnel and rinsed with distilled water. The rinsed presscake is then transferred to a 250 ml 3-neck Morton flask fitted with a stirring shaft, pH meter and temperature probe. A solution of 1.0 grams of dextrose in 75 ml of distilled water is added to the flask and stirred at 250 rpm. Through the temperature probe port of the flask a solution of 1.0 grams silver nitrate in 100 ml of distilled water containing a molar excess of 2-amino-2-methyl propanol is added at 10 ml per minute. The reaction is stirred an additional 30 minutes, filtered on a Buchner funnel, rinsed with distilled water and dried at 120° C.

EXAMPLE 11

In a 1 liter flask, 50 g of product produced in Example 9 is slurried in 300 ml of distilled water, stirred at 200 rpm and heated to 75° C. The pH is lowered to 5 using 15% acetic acid. A solution of 22.5% $Fe(NO_3)_3 \cdot 9H_2O$ is added at 0.25 ml/min. Once the pH reaches 3.5, 10% NaOH is used to hold the pH constant. Approximately 200 ml of the iron(III) nitrate solution is added. The resulting sample is filtered, washed, and dried at 95° C.

EXAMPLE 12

The effect material prepared according to example 1 is incorporated into polypropylene step chips at 1% concentration. The step chips are appropriately named since they have graduating thickness at each step across the face of the chip. The graduating steps allow one to examine the different effect of the effect material based on polymer thickness.

EXAMPLE 13

The effect material prepared according to example 1 is incorporated into a nail enamel. 10 g of the effect material is mixed with 82 g of suspending lacquer SLF-2, 4 g lacquer 127P and 4 g ethyl acetate. The suspending lacquer SLF-2 is a generic nail enamel consisting of butyl acetate, toluene, nitrocellulose, tosylamide/formaldehyde resin, isopropyl alcohol, dibutyl phthalate, ethyl acetate, camphor, n-butyl alcohol and silica and 127P is a moderately viscous, nitrocellulose lacquer containing butyl acetate, toluene, nitrocellulose, tosylamide/formaldehyde resin, isopropyl alcohol, dibutyl phthalate, ethyl acetate, camphor, n-butyl alcohol and methoxypropanol acetate.

EXAMPLE 14

In a similar fashion, a effect material prepared according to example 1 is incorporated into a non-nitrocellulose based nail enamel. 10 g of the effect material is mixed with 82 g of Avalure AC 315 polymer, an acrylic polymer in ethanol, and acetone used in place of nitrocellulose.

EXAMPLE 15

A 10% by weight effect material from example 1 is sprayed in a polyester TGIC powder coating from Tiger Drylac using a PGI corona Gun #110347. The effect material is mixed in a clear polyester system and sprayed over a RAL 9005 black powder sprayed base. The effect material is highly attracted to the ground metal panel. Additionally, due to its high affinity to orient closely to the surface, it produces a finish that is high in distinctness of image (DOI). It does not require an additional clear coat to reduce protrusion often caused by traditional pearlescent (effect) and metal flake pigments.

EXAMPLE 16

A 10% dispersion of the effect material prepared according to example 1 is mixed into a clear acrylic urethane basecoat clearcoat paint system DBX-689 (PPG) along with various PPG tints to achieve desired color. The tint pastes consist of organic or inorganic colorants dispersed at various concentrations in a solventborne system suitable with the DMD Deltron Automotive Refinish paint line from PPG. The complete formulation is sprayed using a conventional siphon feed spraygun onto 4×12 inch (about 10×30 cm) curved automotive type panels supplied by Graphic Metals. The panel is clear coated with PPG 2001 high solids polyurethane clear coat and air dried.

Various changes and modifications can be made in the process and products of the invention without departing from the spirit and scope thereof. The various embodiments disclosed herein were for the purpose of illustration only and were not intended to limit the invention.

What is claimed is:

1. A color effect material comprising a platelet-shaped substrate sequentially encapsulated with:
    a first highly reflective layer of silver;
    a second spacer layer which does not provide a hue angle change of more than 100° relative to the incident angle of light; and
    an iron oxide layer.
2. The color effect material of claim 1, wherein the substrate is selected from the group consisting of mica, aluminum oxide, bismuth oxychloride, boron nitride, glass flake, iron oxide-coated mica, iron oxide-coated glass, silicon dioxide, titanium dioxide-coated mica and titanium dioxide-coated glass.
3. The color effect material of claim 1, wherein the iron oxide layer is encapsulated by an outer layer that is selectively transparent to light directed thereon.
4. The color effect material of claim 3, wherein said selectively transparent outer layer is selected from the group consisting of silicon, titanium dioxide, chromium oxide, aluminum, aluminum oxide and a mixed metal oxide.
5. The color effect material of claim 1, wherein the first layer is an electroless silver deposition layer.
6. The color effect material of claim 5, wherein the spacer layer is selected from the group consisting of silicon dioxide, magnesium fluoride, magnesium oxide, magnesium hydroxide, aluminum oxide, aluminum hydroxide, titanium oxide and titanium hydroxide.
7. The color effect material of claim 6, wherein the spacer layer is silicon dioxide.
8. The color effect material of claim 1, wherein the spacer layer is a sol-gel deposition layer.
9. The color effect material of claim 1, wherein the substrate is platelet-shaped mica or glass.
10. The color effect material of claim 1, wherein the substrate is platelet-shaped mica, and the spacer layer is silicon dioxide.
11. A method of making a color effect material comprising:
    coating a platelet-shaped substrate with a first encapsulating layer of highly reflective silver;
    encapsulating the first layer with a spacer layer which does not provide a hue angle change of more than 100° relative to the incident angle of light directed thereto; and
    encapsulating the spacer layer with an iron oxide layer.
12. The method of claim 11, wherein the substrate is selected from the group consisting of mica, aluminum oxide, bismuth oxychloride, glass flake, silicon dioxide, iron oxide-coated mica, iron oxide-coated glass, titanium dioxide-coated glass and titanium dioxide-coated mica.
13. The method of claim 12, wherein the spacer layer is selected from the group consisting of silver, gold, platinum, palladium, alloys of said metals, silicon, chromium oxide, a mixed metal oxide and aluminum.
14. The method of claim 12, wherein the spacer layer is selected from the group consisting of silicon dioxide, magnesium fluoride, magnesium oxide, magnesium hydroxide, aluminum oxide, aluminum hydroxide, titanium oxide and titanium hydroxide.
15. The method of claim 12, wherein the spacer layer is silicon dioxide.
16. A cosmetic preparation containing a colorant wherein the colorant is a color effect material of claim 1.
17. A coating formulation comprising containing a colorant wherein the colorant is a color effect material of claim 1.
18. A plastic formulation containing a colorant wherein the colorant is a color effect material of claim 1.

* * * * *